United States Patent Office 3,097,630
Patented July 16, 1963

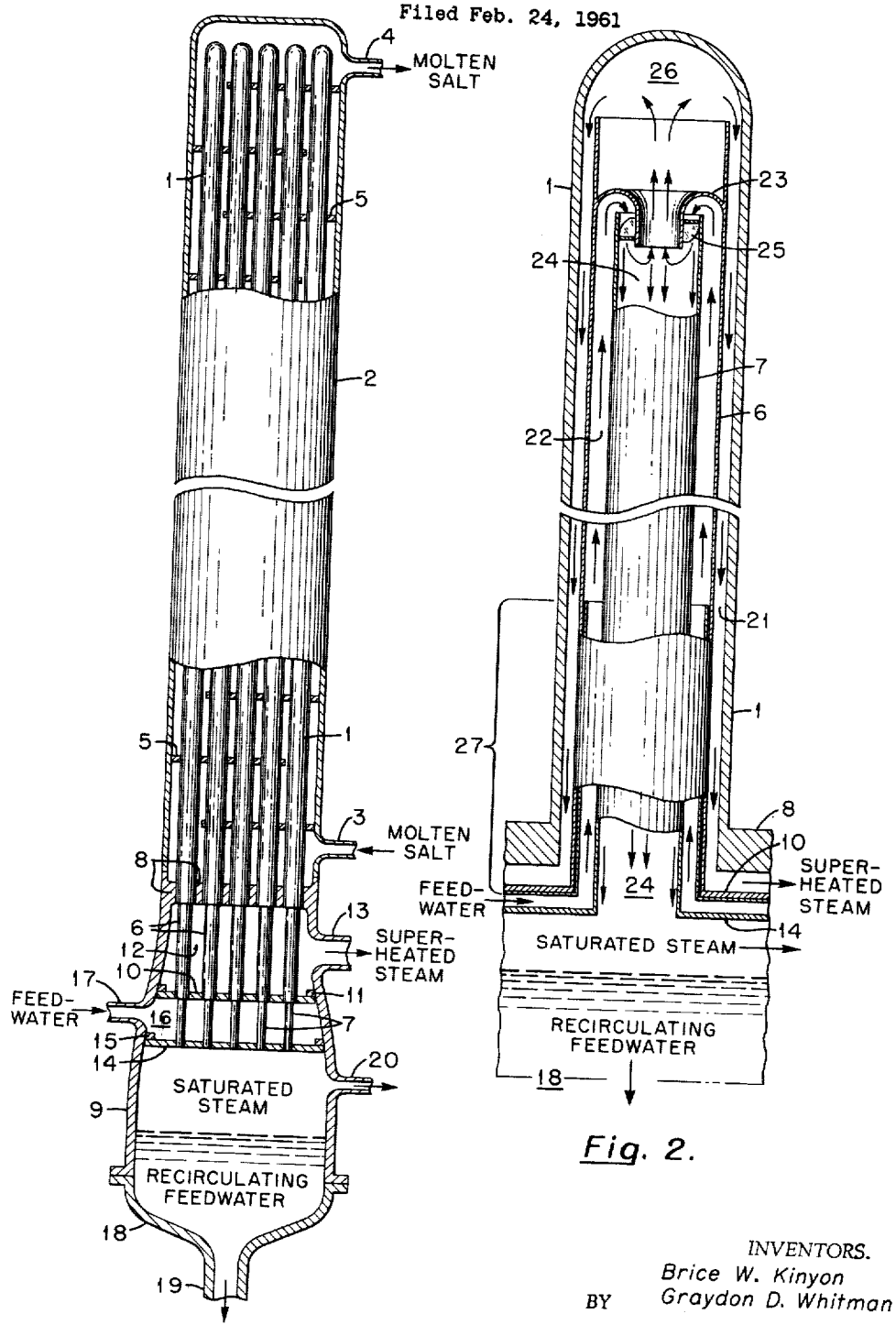

3,097,630
STEAM GENERATOR
Brice W. Kinyon and Graydon D. Whitman, Oak Ridge, Tenn., assignors to the United States of America as represented by the United States Atomic Energy Commission
Filed Feb. 24, 1961, Ser. No. 91,558
6 Claims. (Cl. 122—34)

This invention relates generally to the steam-generator art, and more particularly to a steam generator adapted for use in neutronic-reactor, power-generating systems.

In very general terms, a nuclear power system consists of a reactor which produces thermal energy, a steam generator coupled to the reactor by one or more heat transfer loops, and a turbine-generator to convert the generated steam to electrical energy. Since the efficiency of any power generating system is directed related to the temperature at which energy is produced, there has been a great effort in the neutronic reactor art to operate reactors at temperatures as high as possible. A portion of this effort has been devoted to the development of reactors which are cooled by high-melting molten salts such as the salts disclosed in U.S. Patent No. 2,920,024, which issued on January 5, 1960, in the names of Charles J. Barton and Warren R. Grimes for "Reactor Fuel Composition." With salts of this type, reactor operation well in excess of 1000° F. has been achieved.

A very serious problem has arisen in this effort, however. Due to the great temperature difference between the reactor-coolant salts and saturated water at reasonable pressures (e.g., salt at 1200° F. and water at 500° F.), a steam generator designed to produce steam directly from the reactor coolant would be subject to great thermal shocking. Moreover, since many desirable salts have very high melting points (i.e., greater than 500° F.), freezing of the salt would occur in the steam generator in the area of the feed-water inlet. To avoid the latter problem, secondary coolant loops through which sodium —which has a low melting point—is circulated have been resorted to. In these systems the reactor-coolant heat is transferred to sodium which is then circulated to a steam generator. This scheme does not, however, avoid the problem of severe thermal shocking.

It is, therefore, a general object of the invention to provide a steam generator through which high-melting salts at high temperatures can be circulated in heat transfer relationship with water without incurring severe thermal shocking of the generator or freezing of the salt.

Fluid-fueled neutronic reactors inherently operate at a constant mean temperature irrespective of power output, the temperature rise of the fuel as it traverses the core being the only temperature variation of the reactor-coolant system. For example, a fluid fueled reactor may be designed to operate at 1200° F. At no-load or zero power the inlet, mean, and outlet temperatures would be 1200° F. As a load is applied, the inlet-reactor-coolant temperature falls and the outlet temperature increases, the phenomenon being caused by the negative temperature coefficient of reactivity which is provided by the fluid fuel. Thus, at full power the inlet reactor coolant temperature might be 1175° F. and the outlet temperature 1225° F., the mean temperature still being 1200° F. It can thus be seen that in power systems in which a fluid-fueled reactor is used, the reactor coolant passing through the steam generator is always at a high temperature. For this reason it is necessary to progressively decouple the steam generator from the circulating fuel as the load (i.e., the demand for steam) decreases. Heretofore, no steam generator has had a completely satisfactory decoupling means.

It is, therefore, a further object of the invention to provide a steam generator which is easily uncoupled from its heat source as the demand for steam decreases.

Prior steam-generating systems capable of producing saturated steam have been either single-unit, once-through generators, or of the multiple-unit, recirculating-feed water type. Single-unit, once-through generators are disadvantageous with respect to feed-water purity. Since all of the water fed to such a unit is vaporized, feed water with relatively small amounts of impurities can still cause great inconvenience and expense: tubes become caked with deposited solids which interfere with a uniform transfer of heat. For this reason, high purity feed water is necessary. Recirculating systems avoid this problem by vaporizing only a portion of the feed water in a boiling unit, and superheating the resultant steam in a separate heat exchange unit. The necessity of having two separate heat exchangers is a disadvantage. Thus, it can be seen that neither type of steam generator has been completely satisfactory.

Accordingly, the provision of a single-unit, recirculating-feed water generator capable of producing superheated steam is a further object of the invention.

These and other objects will become more fully apparent from an examination of the following description of the invention and the drawings appended thereto, wherein:

FIG. 1 is an over-all view of a steam generator adapted to attain the objects mentioned above; and FIG. 2 is a schematic representation of one tube that steam generator showing the pattern of flow therethrough.

In accordance with the principles of the present invention, the above-listed objects are attained by providing a tube-and-shell steam generator in which steam is produced within vertically-disposed outer tubes, each of which outer tubes contains two concentrically-disposed tubes, intermediate and inner tubes hereinafter, which define a central cylindrical channel. An inner annulus is provided between the two last-mentioned tubes, and an outer annulus between the intermediate tube and the outer tube. Means are provided whereby feed water is passed upwardly through the inner annulus, wherein some saturated steam is formed, and turned 180° into the central channel where steam separation occurs. The steam in annulus 21 acts as a heat transfer medium. Additional means are provided to allow saturated steam to flow from the central channel to the outermost annulus, through which annulus the steam may be downwardly passed to effect superheating. Saturated steam not withdrawn through the outer annulus may be withdrawn directly from the central channel.

To facilitate a more complete understanding of the invention, the following detailed description of an operable embodiment is offered. Referring first to FIG. 1, which is an over-all view of the steam generator, a plurality of bayonet tubes 1 are vertically disposed with their closed ends up within an enclosing shell 2, through which a hot liquid is circulated from inlet 3 to outlet 4. Baffles 5 are provided within shell 2 to prevent channeling of the liquid flow therethrough.

Each bayonet tube 1 is provided with an intermediate tube 6 and an inner tube 7, both of which extend nearly the full length of the bayonet tube to a point near the closed end thereof. The diameter of intermediate tube 6 is slightly smaller than the inner diameter of bayonet tube 1 so that an annulus is formed therebetween. A similar annulus is formed between intermediate tube 6 and inner tube 7.

The lower open ends of bayonet tubes 1 terminate and are secured to a high-pressure tube sheet 8 formed by the upper end of a high-pressure vessel 9. Tubes 6 terminate and are secured to a low-pressure tube sheet 10 carried by flanges 11, thus forming a header 12 which communicates with the annuli formed by bayonet tubes 1 and tubes 6. Outlet 13 is provided in the wall of vessel 9.

The lower ends of tubes 7 terminate and are secured to a second low-pressure tube sheet 14, which is carried by flange 15. Tube sheets 10 and 14 thus form a second header 16, which communicates with the annuli formed by tubes 6 and 7. An inlet 17 is provided through the wall of vessel 9.

Secured to vessel 9 by means of a flanged connection is a high-pressure, bell-shaped water reservoir 18, which is provided with a drain line 19 and an outlet steam line 20.

Referring now to FIG. 2, which is a detail schematic view of the interior of one bayonet tube, bayonet tube 1 is shown secured to tube sheet 8 and provided with an intermediate tube 6 and an inner tube 7, which are secured to low-pressure tube sheets 10 and 14, respectively. Tube 6 is spaced away from the inner wall of bayonet tube 1 by any suitable spacing means, thus forming annulus 21. In a similar manner, tubes 6 and 7 form an inner annulus 22, which is terminated at its upper end by a flow-reversal baffle 23. Central channel 24 is formed by tube 7 and communicates with annulus 22 through a steam separator 25 and flow-reversal baffle 23.

The operation of the steam generator will now be described, reference being made to FIGS. 1 and 2 conjunctively. Feed water is introduced into header 16 through inlet 17 and flows upwardly through inner annulus 22 where boiling occurs. Upon reaching flow-reversal baffle 23, the water-steam mixture is turned downwardly through steam separator 25 into central channel 24, whereupon the water falls into reservoir 18 from where it is recirculated as needed. The saturated steam which was separated from the water can flow either upwardly into the volume 26 defined by the closed end of bayonet tube 1 or downwardly through central channel 24 into reservoir 18 from where it can be withdrawn through outlet 20. Alternatively, the saturated steam may be passed from volume 26 downwardly through outer annulus 21, where superheating occurs, into header 12, from where it may be withdrawn through outlet line 13. The lower portion 27 of tube 6 is of double-walled construction to insulate annulus 21 from annulus 22 and provide a final superheating section to allow a rapid increase in the steam temperature.

The steam generator described above is advantageous over prior generators in many respects. First, inlet feed water, which is introduced through inner annulus 22, is never in contact with the hot bayonet tube 1, but is insulated therefrom by the steam which occupies outer annulus 21. Thus, it can be seen that thermal shocking is materially reduced and that cold inlet water can never cause freezing of a high-melting salt occupying the volume exterior to bayonet tube 1. Moreover, water can never flood outer annulus 21.

Secondly, the generator decouples itself automatically as the demand for steam decreases. As the turbine load decreases, more saturated and less superheated steam is called for. The steam velocity through outer annulus 21 decreases automatically causing a decrease in the rate of heat transfer from the hot liquid on the exterior of beyonet tube 1 to the feed water flowing through inner annulus 22. At no-load conditions, the flow of feed water may be stopped completely, and restarted at any later time without incurring severe thermal shocking.

Thirdly, as can be seen, the generator of the present invention is a single unit with all heat transfer being conducted across the area provided by the exterior of the bayonet tubes. Thus, the inventory of heating fluid is minimized and space requirements are less than that required by prior recirculating generators.

Lastly, since the feed water is continuously recirculated, the concentration of impurities in the feed water can be controlled by conventional means. Water of very high purity is not required.

Since many modifications of and deviations from the embodiment described above may be made without departing from the scope or spirit of the present invention, it is intended that the invention be limited only by the claims appended hereto.

What is claimed is:

1. In a steam generator wherein a heating liquid is circulated over the exterior of vertically-disposed, water-conducting tubes, the improved water-conducting tube which comprises an inner tube, an intermediate tube having a diameter slightly larger than the diameter of said inner tube and disposed coaxially therewith, thus defining a first annulus, an outer tube having a diameter slightly larger than the diameter of said intermediate tube and disposed coaxially therewith, thus defining a second annulus, means to direct a flow of feed water upwardly through said first annulus, means located at the upper end of said first annulus to direct the flow of water downwardly into the interior of said inner tube and permit separation of steam therefrom, and a steam chamber located above and communicating with the interior of said inner tube and said second annulus for collecting steam formed in the water traversing said first annulus, and directing it downwardly through the second annulus.

2. In a steam generator wherein a heating liquid is circulated over the exterior of vertically-disposed, water-conducting tubes, the improved water-conducting tube which comprises an inner tube, an intermediate tube having a diameter slightly larger than the diameter of said inner tube and disposed coaxially therewith, thus defining a first annulus, an outer tube having a diameter slightly larger than the diameter of said intermediate tube and disposed coaxially therewith, thus defining a second annulus, means to direct a flow of feed water upwardly through said first annulus, means located at the upper end of said first annulus to direct the flow of water downwardly into the interior of said inner tube and permit separation of the steam from the water, a steam chamber located above and communicating with the interior of said inner tube and said second annulus for collecting steam formed in the water traversing said first annulus and directing it downwardly through the second annulus, a water chamber located at the bottom of said inner tube communicating with the interior thereof and adapted to store water received therefrom, means to maintain a selected water level in said water chamber, the wall of said water chamber being provided with a steam outlet port located above said selected water level.

3. In a steam generator wherein a heating liquid is circulated over the exterior of vertically-disposed, water-conducting tubes, the improved water-conducting tube which comprises an inner tube, an intermediate tube having a diameter slightly larger than the diameter of said inner tube and disposed coaxially therewith, thus defining a first annulus, an outer tube having a diameter slightly larger than the diameter of said intermediate tube and disposed coaxially therewith, thus defining a second annulus, means to direct a flow of feed water upwardly through said first annulus, means located at the upper end of said first annulus to direct the flow of water downwardly into the interior of said inner tube and permit separation of the steam therefrom, a steam chamber located above and communicating with the interior of said inner tube and said second annulus for collecting steam formed in the water traversing said first annulus and directing it downwardly through the second annulus, a water chamber located at the bottom of said inner tube and communicating with the interior thereof and adapted to store water received therefrom, means to maintain a selected water level in said water chamber, the wall of said water chamber being provided with a steam outlet port located above said water level, and a second steam chamber provided with an outlet port, said second steam chamber being located at the bottom of said second annulus and communicating therewith.

4. In a tube-and-shell steam generator wherein a multiplicity of vertically-disposed bayonet tubes are enclosed by a shell adapted to conduct the flow of heating liquid over the exterior of said tubes, the improvement comprising an inner tube, an intermediate tube having a diameter slightly larger than the diameter of said inner tube and disposed coaxially therewith, thus forming a first annulus, an outer bayonet tube of slightly larger diameter than the diameter of said intermediate tube, having its closed end up, surrounding and disposed coaxially with said intermediate tube, thus forming a second annulus, means to direct a flow of feed water upwardly through said first annulus, means located at the upper end of said first annulus to direct the flow of water downwardly into the interior of said inner tube and permit separation of steam therefrom, said inner tube communicating with the closed end of the outer tube to direct steam into the second annulus, a water chamber located at the bottom of said inner tube communicating with the interior thereof and adapted to store water received therefrom, and means to maintain a selected water level in said water chamber, the walls of said water chamber being provided with a steam outlet port located above said selected water level.

5. In a tube-and-shell steam generator wherein a multiplicity of vertically-disposed bayonet tubes are enclosed by a shell adapted to conduct the flow of heating liquid over the exteior of said tubes, the improvement comprising an inner tube, an intermediate tube having a diameter slightly larger than the diameter of said inner tube and disposed coaxially therewith, thus forming a first annulus, an outer bayonet tube of slightly larger diameter than the diameter of said intermediate tube, having its closed end up, surrounding and disposed coaxially with both of said inner and intermediate tubes, thus forming a second annulus, means to dirert a flow of feed water upwardly through said first annulus, means located at the upper end of said first annulus to direct the flow of water downwardly into the interior of said inner tube to permit separation of the steam therefrom, said inner tube communicating with the closed end to direct steam into the second annulus, a water chamber located at the bottom of said inner tube communicating with the interior thereof and adapted to store water received therefrom, means to maintain a selected water level in said water chamber, the wall of said water chamber being provided with a steam outlet port located above said selected water level, and a steam chamber located at the bottom of said second annulus and communicating therewith, the wall of said steam chamber being provided with outlet port.

6. A vertical tube steam generator for vaporizing liquids comprising an inner tube and an intermediate tube concentrically positioned with respect to each other to define a first annulus between them, an outer tube having its exterior surface in contact with a heating liquid concentrically positioned with respect to the intermediate tube to form a second annulus, means for supplying feed water to the first annulus to vaporize it as it rises, an obstruction at the upper extremity of the first annulus for directing the feed water to the inner tube where the vapors may separate and rise and liquid is returned to the feed water source, and a chamber at the upper extremity of the inner tube for collecting the vapors as they rise and directing them into the outer annulus to receive additional heat as they contact the outer tube in travelling downwardly through the second annulus.

References Cited in the file of this patent
UNITED STATES PATENTS

| | | |
|---|---|---|
| 2,336,832 | Badenhausen | Dec. 14, 1943 |
| 2,993,480 | Huet | July 25, 1961 |
| 3,049,105 | Waldron | Aug. 14, 1962 |

UNITED STATES PATENT OFFICE
CERTIFICATE OF CORRECTION

Patent No. 3,097,630　　　　　　　　　　　　　　　　July 16, 1963

Brice W. Kinyon et al.

It is hereby certified that error appears in the above numbered patent requiring correction and that the said Letters Patent should read as corrected below.

Column 2, line 30, after "tube" insert -- from --; column 3, line 21, for "bayone" read -- bayonet --; line 65, for "beyonet" read -- bayonet --; column 5, line 33, for "exteior" read -- exterior --; column 6, line 2, for "dirert" read -- direct --.

Signed and sealed this 21st day of January 1964.

(SEAL)
Attest:
ERNEST W. SWIDER　　　　　　　　　　　　　　　EDWIN L. REYNOLDS

Attesting Officer　　　　　　　　　　　　　Acting Commissioner of Patents